US008675555B2

(12) United States Patent
Sarikaya et al.

(10) Patent No.: US 8,675,555 B2
(45) Date of Patent: Mar. 18, 2014

(54) PROXY MOBILE INTERNET PROTOCOL VERSION SIX MULTIHOMING SUPPORT FOR FLOW MOBILITY

(75) Inventors: Behcet Sarikaya, Wylie, TX (US); Yangsong Xia, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 387 days.

(21) Appl. No.: 12/951,796

(22) Filed: Nov. 22, 2010

(65) Prior Publication Data

US 2011/0164599 A1 Jul. 7, 2011

Related U.S. Application Data

(60) Provisional application No. 61/292,817, filed on Jan. 6, 2010.

(51) Int. Cl.
*H04W 4/00* (2009.01)
*H04L 12/28* (2006.01)

(52) U.S. Cl.
USPC ............ 370/328; 370/329; 370/331; 370/401

(58) Field of Classification Search
USPC .................. 370/328, 329, 331, 338, 400, 401
See application file for complete search history.

(56) References Cited

U.S. PATENT DOCUMENTS

| | | | |
|---|---|---|---|
| 2010/0118879 A1* | 5/2010 | Oulai et al. | 370/401 |
| 2010/0290621 A1* | 11/2010 | Muhanna et al. | 380/270 |
| 2010/0332627 A1 | 12/2010 | Wang | |
| 2011/0134883 A1* | 6/2011 | Kang | 370/331 |
| 2011/0246629 A1* | 10/2011 | Savolainen et al. | 709/220 |

FOREIGN PATENT DOCUMENTS

| | | |
|---|---|---|
| CN | 101534501 A | 9/2009 |
| EP | 1914955 A1 | 4/2008 |
| WO | 2009048583 A1 | 4/2009 |
| WO | WO 2009127681 A1 * | 10/2009 |

OTHER PUBLICATIONS

Bradner, S., "Key Words for Use in RFCs to Indicate Requirement Levels," RFC 2119, Mar. 1997.
Rose, M., "Writing I-Ds and RFCs Using XML," RFC 2629, Jun. 1999.
Gundavelli, S., et al., "Proxy Mobile IPv6," RFC 5213, Aug. 2008.
Johnson, D., et al., "Mobility Support in IPv6," RFC 3775, Jun. 2004.

(Continued)

*Primary Examiner* — Michael Thier
*Assistant Examiner* — Feben M Haile
(74) *Attorney, Agent, or Firm* — Conley Rose, P.C.; Grant Rodolph; Brandt D. Howell

(57) ABSTRACT

An apparatus comprising: a local mobility anchor (LMA) configured to maintain a plurality of binding cache entries (BCEs) for two or more active interfaces between a mobile node (MN) and a plurality of mobile access gateways (MAGs) comprising a first MAG and a second MAG, wherein the BCEs comprise a first BCE that corresponds to a home interface between the MN and the first MAG and that comprises a first list of home network prefixes (HNPs), and wherein the BCEs further comprise a second BCE that is linked to the first BCE, that corresponds to a secondary interface between the MN and the second MAG, and that comprises a second list of HNPs.

19 Claims, 4 Drawing Sheets

(56) References Cited

OTHER PUBLICATIONS

Wakikawa, R., et al., "IPv4 Support for Proxy Mobile IPv6," draft-ietf-netlmm-pmip6-ipv4-support-17.txt, Sep. 12, 2009.
Yokota, H., et al., "Inter-Technology Handoff Support in Mobile Node for Proxy Mobile IPv6," draft-yokota-netlmm-pmipv6-mn-itho-support-02, Oct. 26, 2009.
Soliman, H., et al., "Flow Bindings in Mobile IPv6 and NEMO Basic Support," draft-ietf-mext-flow-binding-04.txt, Nov. 9, 2009.
Soliman, H., et al., "Flow Bindings in Mobile IPv6 and NEMO Basic Support," draft-ietf-mext-flow-binding-11.txt, Oct. 5, 2010.
Wakikawa, R., et al., "IPv4 Support for Proxy Mobile IPv6," RFC 5844, May 2010.
Melia, T., et al., "Logical Interface Support for Multi-mode IP Hosts," draft-ietf-netext-logical-interface-support-01.txt, Oct. 24, 2010.
Foreign Communication From a Related Counterpart Application, PCT Application PCT/CN2010/079765, International Search Report dated Mar. 17, 2011, 4 pages.
Foreign Communication From a Related Counterpart Application, PCT Application PCT/CN2010/079765, Written Opinion dated Mar. 17, 2011, 7 pages.
Sarikaya, B., et al., "PMIPv6 Multihoming Support for Flow Mobility," draft-sarikaya-netext-fb-support-extensions-00.txt, Feb. 1, 2010, 10 pages.
Bernardos, C.J., Ed., "Proxy Mobile IPv6 Extensions to Support Flow Mobility," NETEXT Working Group, Internet Draft, draft-bernardos-netext-pmipv6-flowmob-01, Oct. 25, 2010, 30 pages.
Tsirtsis, G., et al., "Traffic Selectors for Flow Bindings," Network Working Group, Internet Draft, draft-ieft-mext-binary-ts-02.txt, Dec. 16, 2009, 19 pages.
Tsirtsis, G., et al., "Traffic Selectors for Flow Bindings," Network Working Group, Internet Draft, draft-ieft-mext-binary-ts-05.txt, Oct. 5, 2010, 20 pages.
Johnson, D., et al., "Mobility Support in IPv6," IETF Mobile IP Working Group, Internet Draft, draft-ieft-mext-rfc3775bis-05.txt, Oct. 19, 2009, 175 pages.
Perkins, C., Ed., et al., "Mobility Support in IPv6," IETF Mobile IP Working Group, Internet Draft, draft-ieft-mext-rfc3775bis-10.txt, Oct. 13, 2010, 178 pages.
Wakikawa, R., Ed., et al., "Multiple Care-of-Addresses Registration," Network Working Group, RFC 5648, Oct. 2009, 36 pages.

* cited by examiner

PROXY MOBILE INTERNET PROTOCOL VERSION SIX MULTIHOMING SUPPORT FOR FLOW MOBILITY

CROSS-REFERENCE TO RELATED APPLICATIONS

The present application claims priority to U.S. Provisional Patent Application No. 61/292,817 filed Jan. 6, 2010 by Behcet Sarikaya et al. and entitled "PMIPv6 Multihoming Support for Flow Mobility," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet Protocol (IP) version six (IPv6) is being introduced for various access technologies such as Digital Subscriber Line (DSL), Fiber to the Home (FTTH) over Ethernet based on the Institute of Electrical and Electronics Engineers (IEEE) 802.3 standards, Wireless Fidelity (WiFi) based on the IEEE 802.11 standards, and Worldwide Interoperability for Microwave Access (WiMAX) based on the IEEE 802.16 standards. Mobile IPv6 (MIPv6) is a protocol that allows a mobile node (MN), such as a mobile device, to handle its mobility management. As such, the MN may communicate using an access router (AR) and a MIPv6 home agent (HA) for the MN. Proxy Mobile IPv6 (PMIPv6) is a protocol that allows a MN to avoid handling its own mobility management. In PMIPv6, the mobility management of the MN is handled by a mobile access gateway (MAG) and a PMIPv6 Local Mobility Anchor (LMA) on behalf of the MN. In some access networks, the LMA can act as a MIPv6 HA for some of the MNs and as a PMIPv6 LMA for other MNs to handle the mobility management of the MNs in the network.

SUMMARY

In one embodiment, the disclosure includes an apparatus comprising: a LMA configured to maintain a plurality of binding cache entries (BCEs) for a plurality of active interfaces between a MN and a plurality of MAGs comprising a first MAG and a second MAG, wherein the BCEs comprise a first BCE that corresponds to a home interface between the MN and the first MAG and that comprises a first list of home network prefixes (HNPs), and wherein the BCEs further comprise a second BCE that is linked to the first BCE, that corresponds to a secondary interface between the MN and the second MAG, and that comprises a second list of HNPs.

In another embodiment, the disclosure includes a network component comprising a receiver unit configured to receive a first proxy binding update (PBU) message for a home interface between a MN and a first MAG and a second PBU message for a second interface between the MN and a second MAG, a logic circuitry configured to process the first PBU message to create a first BCE for the home interface that comprises a first list of HNPs and to process the second PBU message to create a second BCE for the second interface that comprises a second list of HNPs associated with a secondary interface (S) flag and the first BCE, and a transmitter unit configured to send a proxy binding acknowledgement (PBA) message to the first MAG and the second MAG that comprises the first list of HNPs, the second list of HNPs, and the S flag associated with the second list of HNPs.

In a third aspect, the disclosure includes a method comprising detecting a connection with a MN on a new interface, sending a PBU message to a LMA that indicates the new interface, receiving a PBA message from the LMA that comprises a plurality of HNPs for the MN associated with an S flag if the new interface is not a home interface of the MN, and receiving a plurality of HNPs associated with a home interface (H) flag that corresponds to the home interface of the MN.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Directing incoming traffic over one of a plurality of different active MN interfaces, which is referred to as multi-homing, is supported in MIPv6 using home addresses, as described in Internet Engineering Task Force (IETF) Request for Comments (RFC) 5648, which is incorporated herein by reference. Accordingly, when multiple interfaces are active at a HA, the HA may decide how to route incoming packets to the different interfaces based on flow binding entries established with one or more MNs. A MN may use its home address (HoA) as the source address to which incoming packets may be directed. The MN may register its active flows with the HA using the HoA, and the HA may keep a plurality of flow binding entries for each HoA. The HA may forward packets to a care-of-address (CoA) of an active interface after matching the CoA with a list of flow binding entries. PMIPv6 does not currently support a similar multi-homing mechanism since each active interface is treated separately, where different BCE is created at the LMA for each interface as described in IETF RFC 5213, which is incorporated herein by reference.

Disclosed herein is a system and method for implementing multi-homing and improving flow mobility in PMIPv6. The LMA may be configured to direct incoming traffic for the MN over one of multiple active MN interfaces using a HoA associated with a home interface of the MN. To redirect incoming packets using the same MN HoA, the LMA may use one or more associated BCEs that correspond to the different MN interfaces. The BCEs may comprise a home BCE that corresponds to the MN home interface and that comprises a home interface flag and a plurality of HNPs assigned to the home interface. The BCEs may also comprise at least one BCE that corresponds to a secondary interface of the MN and that comprises a secondary interface flag. The HNPs and corresponding flags may also be communicated to corresponding MAGs that are associated with the interfaces, which may maintain the HNPs and the flags in BU list entries.

Figure 1:
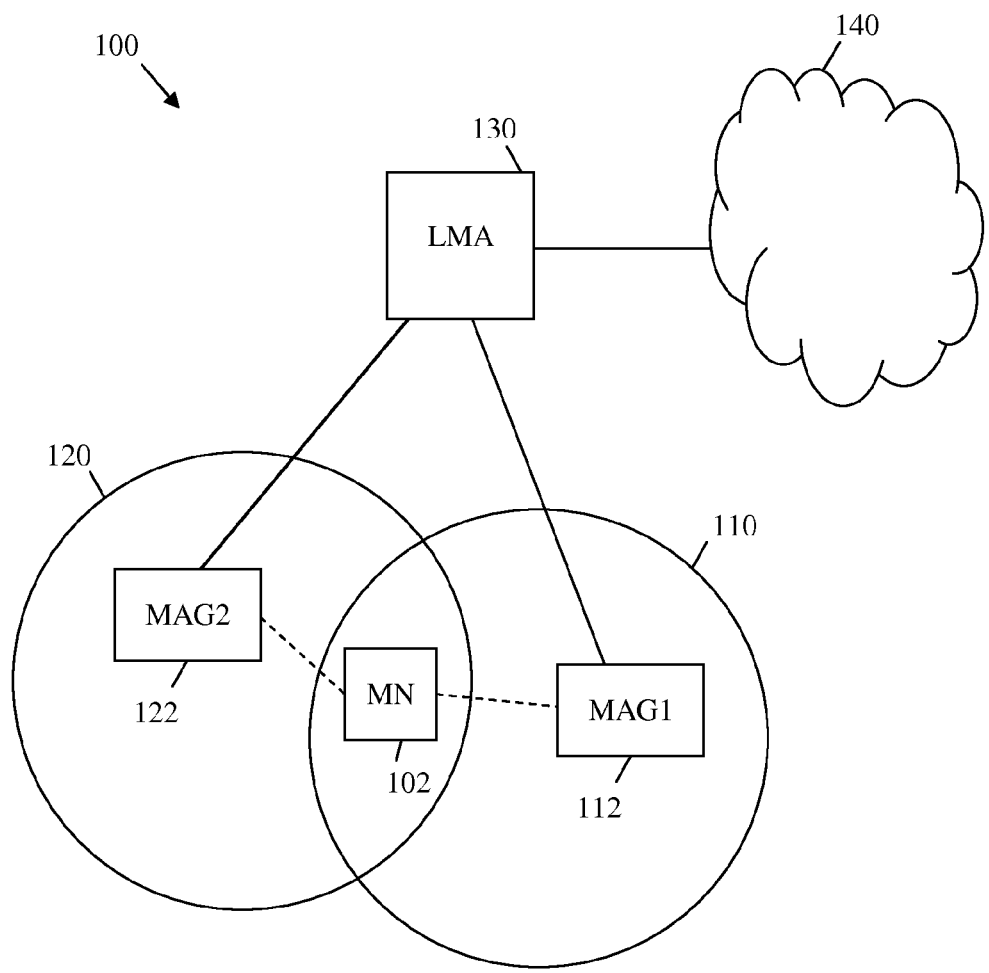
FIG. 1 is a schematic diagram of one embodiment of a wireless access network system.

FIG. 1 illustrates an embodiment of a wireless access network system 100, which may support flow binding in PMIPv6. The wireless access network system 100 may comprise a MN 102, a first MAG 112 (MAG1) in a first wireless access network 110, a second MAG 122 (MAG2) in a second wireless access network 120, a LMA 130, and a service provider network 140. The first wireless network 110 and the second wireless network 120 may independently and simultaneously establish connections and communicate with the service provider network 140 directly or via the LMA 130. For example, the first wireless access network 110 may be a Third Generation Partnership Project (3GPP) network and the second wireless network 120 may be an IEEE 802.11 Wireless Local Area Network (WLAN), also referred to as WiFi network. The MN 102 may be located in the first wireless network 110 and/or the second wireless network 120, e.g. within the coverage range of the network(s), and thus may communicate with the service provider network 140. It will be appreciated that FIG. 1 illustrates only one embodiment of the wireless access network system 100. In alternative embodiments, the MN 102 may be located in any of a plurality of different wireless networks, which may support PMIPv6. Each network may comprise a corresponding MAG, which may be coupled to the LMA 130. The MN 102 may access any of the wireless networks to communicate with the service provider network 140 or other networks (not shown).

In an embodiment, the MN 102 may be any mobile device or component configured to use the first MAG 112, the second MAG 122, and/or the LMA 130 to access the server provider network 140 or other network(s). Specifically, the MN 102 may be a mobile user-oriented device that communicates with the service provider network 140, e.g. via the first access wireless network 110 and/or the second wireless access network 120. For example, the MN 102 may be a cellular telephone, a notebook computer, a personal digital assistant (PDA), or any other wireless device. Alternatively, the MN 102 may be a fixed communications device, such as a desktop computer or set top box, which may be connected to the first MAG 112, the second MAG 122, and/or the LMA 130 using wireless technology.

The MN 102 may be a single radio MN capable of establishing one active interface at a time or may be a dual or multiple radio MN capable of establishing two or multiple interfaces at a time. The MN 102 may also be capable of establishing inter-technology handover, also referred to herein as vertical handover or handover, e.g. when the MN 102 moves out of coverage area of a technology (e.g. wireless technology) and moves into the coverage area of another technology. As such, the MN 102 may switch its active interface from the first network to the second network, e.g. without interrupting a communication session (e.g. IP session). The MN may also support at least some of the features described in IETF document draft-yokota-draft-ietf-netext-logical-interface-support-01.txt, which is incorporated herein by reference.

In an embodiment, the first MAG 112 and the second MAG 122 may be any devices or components configured to handle mobility management for the MN 102, e.g. based on the proxy mobile IPv6 protocol. Mobility management may comprise binding flows, such as IPv6 flows, to any wireless access network where the MN 102 may establish an active interface. The flows may correspond to services provided to the MN 102 by the service provider network 140 and/or other external networks. For instance, the first MAG 112 and/or the second MAG 122 may bind a flow between the MN 102 and the service provider network 140, without affecting other flows and using the same HoA associated with the MN 102. In a specific embodiment, the first MAG 112 and the second MAG 122 may exchange proxy binding update (PBU) and proxy binding acknowledgement (PBA) messages with the LMA 130 to bind or redirect flows between the first wireless access network 110 and the second wireless access network 120, as described below. Each of the first MAG 112 and the second MAG 122 may forward the services bound in its corresponding network from the provider to the MN 102.

In an embodiment, the LMA 130 may be any device or component that provides connectivity and/or external access to the MN 102 via the first wireless network 110 and/or the second wireless network 120. The LMA 130 may be configured to support the proxy mobile IPv6 protocol to enable mobility for the MN 102. The LMA 130 may also forward one or more flows to the MN 102 via any of the first MAG 112 and the second MAG 122 that may have an active interface with the MN 102. The LMA 130 may also be configured to maintain a flow state table and one or more BCEs for one or more MN interfaces, which may be used to direct the flows on the different interfaces, as described below.

The service provider network 140 may be any network that provides services to the MN 102 via the first wireless access network 110 and/or the second wireless access network 120. For instance, the service provider network 140 may be an Internet Service Provider (ISP), a network service provider (NSP), an application service provider (ASP), or combinations thereof. The services may be provided to the MN 102 in the form of upstream and/or downstream IP packets, such as IP version four (IPv4) and/or IPv6 packets, and may comprise data, text, voice, video, and/or any other services. The packets may be part of an IPv6 flow that may be identified by a source IP address, a destination IP addresses, a transport protocol number, a source port number, a destination port number, or combinations thereof. The services may be directed between the service provider network 140 and the first wireless access network 110 and/or the second wireless access network 120 using the LMA 130.

In some cases, the MN's interface may be a virtual or logical interface. The virtual/logical interface may allow the MN to share prefixes, as well as allow the MN to send packets with a HoA as the source address from both the home and secondary interfaces without the need for tunneling. In MIPv6, the MN tunnels its packets to the HA; however, in PMIPv6 the MN communicates with MAG without tunneling.

In PMIPv6, when a MN (e.g. MN 102) establishes multiple interfaces over the same time period, each interface is managed independently to direct flows. Accordingly, the MN uses different source addresses to send packets over the different interfaces. To support flow mobility, the MN 102 and/or the LMA (e.g. LMA 130) may need to move one flow from one interface to the other. For example, a flow may be moved from a first interface to a second interface of the MN. In this case, the MN may need to stop sending packets on the first interface and change the source address associated with the flow to an address based on a list of HNPs assigned to the secondary interface. Changing the MN's address to switch a flow between interfaces and handle flow mobility in PMIPv6 may pose some difficulty and may not be efficient or practical.

Further, when the MN implements a handover, e.g. to switch a flow from a first interface to a second interface, the MAG (e.g. MAG1 or MAG2) associated with the second interface may send a PBU message to the LMA to register a new corresponding proxy CoA for the second interface. Typically, the MAG may set an access technology type (ATT) and a handover indicator (HI) in the BU message to inform the LMA of the handover. The LMA may detect a handover if the received ATT value is different from a locally stored ATT value in a maintained BCE for the MN and if the received HI value is set to about two, which indicates a handover between two different interfaces of the MN. Typically, to enable session continuity, the LMA may assign the same HNPs associated with the MN's first interface to the secondary interface.

In the scheme above, setting the ATT value properly by the MAG may be easier to implement when the MAG is connected to a single wireless technology than in the case of multiple wireless technologies. Further, according to RFC 5213, the MAG may set the HI value in the PBU message to about one to indicate to the LMA an attachment over a new interface. In response, the LMA 130 may set one or more new prefixes for the MN, create a new BCE, and allocate a new mobility session for the new interface. This behavior triggered by the PBU message and the ATT and HI values in the message may not be easily implemented in PMIPv6 based on current flow mobility mechanisms.

To improve flow mobility in PMIPv6, the MN may use a source address (e.g. HoA) for a plurality of established or active interfaces based on a list of HNPs that are assigned to a home interface from the active interfaces. As such, when multiple interfaces of the MN are active, the incoming packets may be directed to one of the different active interfaces without changing the HoA of the MN and according to a flow state of the MN that is maintained by the LMA. The flow state may be maintained in a flow state table that comprises a plurality of flow binding entries that associate the flows with the corresponding MAGs, such as based on a Proxy CoA for each MAG.

In the case of multi-homing, the MN may have an active home interface and then establish a connection over a new interface, which may cause the corresponding MAG to set the HI value in a PBU message to about one and send the message to the LMA. The LMA may then create a new BCE that comprises a plurality of HNPs and set a flag in the new BCE to a second ("S") value, e.g. an integer value defined as "S". The LMA may add the new BCE for the new MN interface without creating a new mobility session. Instead, the new BCE may be treated as a pointer to another flow binding between the same MN and LMA that corresponds to a home interface. The MN may have as many BCEs (at the LMA) as active MN interfaces, where each active interface may have a corresponding BCE. The BCEs may comprise a home interface BCE and one or more second BCEs associated with secondary interfaces of the MN.

Each BCE at the LMA may comprise a list of IPv6 HNPs assigned to a corresponding interface. The BCE may also comprise an "H" flag associated with the HNPs if the connected interface is the primary interface or an "S" flag if the connected interface is not the home interface. The LMA may maintain the BCE for the home interface regardless whether the home interface or a secondary interface is used instead to direct a flow (e.g. for flow binding). For example, in the case of a handover from the home interface to a secondary interface, the LMA may maintain a first BCE for the home interface and a second BCE for the secondary interface, which may be linked to or associated with the first BCE. As such, the quantity of BCEs maintained at the LMA for a MN may be equal to the active interfaces of the MN.

In an embodiment, after receiving a first PBU message from a first MAG, the LMA may assign an "H" flag to a first BCE. Similarly, after receiving a second PBU message, such as from a second MAG, for an active secondary interface, the LMA may maintain an additional second BCE for the secondary interface and assign an "S" flag to the second BCE. In the case of a single BCE in the LMA, the BCE may or may not comprise an "H" flag and may be associated with a home interface. In the case of multiple BCEs for the same MN, the "H" flag may be needed to indicate which of the BCEs corresponds to the home BCE. The remaining BCEs of the same MN may correspond to secondary interfaces and may or may not comprise an "S" flag. When the LMA and MAG implement a PBU/PBA message exchange that uses the H and S flags, handovers from the home interface or secondary interfaces may not change the type of the interface, i.e. the home interface may continue to be the home interface and any secondary interfaces may continue to be the secondary interfaces. The LMA knows which interface is the home interface and which interface(s) is/are the secondary interface(s), and the LMA can let the new MAG know such by setting H or S flags in the PBA message.

The BCEs of the secondary interfaces may be updated in the LMA by sending PBU messages from the corresponding MAGs. The MAGs may include in the PBU messages the HNPs associated with the secondary interfaces and the HNPs associated with the home interface. The MAGs may also include in the PBU messages "S" flags to indicate the HNPs of the secondary interfaces and an "H" flag to indicate the HNPs of the home interface.

Additionally, the LMA may maintain a flow state table for one or more active interfaces, which may be used to distinguish the interface with the flow binding and direct incoming traffic to the MAG and MN accordingly. The flow state table may describe the condition of flows on one or more active interfaces and may be used by the LMA to associate a flow with a MAG connected to the MN, and hence to an interface corresponding to the flow.

The destination address of an incoming packet (e.g. from the service provider network 140 to the LMA 130) that indicates a MN may be selected from the HNPs associated with the "H" flag in the BCE of the MN's home interface regardless of which interface is used for flow binding. Thus, the same MN HoA may be used as the destination address in the incoming packet regardless of which interface the packet may be forwarded. When the LMA detects the destination address in the incoming packet, the LMA may decide which interface to route the incoming packet by checking a list of flow binding entries in the flow state table, such as described in IETF document draft-ietf-mext-flow-binding-11.txt, which is incorporated herein by reference. The packet may be matched against the flow descriptions in the flow binding entries to retrieve a MAG Proxy-CoA in an entry that matches the packet flow. The LMA may then search the BCE(s) for the MN, which may be assigned the "H" flag and/or "S" flag, and direct the packet on the interface in the BCEs that matches the MAG Proxy CoA.

The LMA may send the HNPs and associated flags in the BCE(s) for one or more interfaces to the corresponding MAG(s). For instance, each MAG may receive in a PBA message the HNPs and associated flags for the home interface and for one or more secondary interfaces associated with the MAG. The MAG may store the HNPs for each interface and the associated flags in a BU list entry. Thus, each BU list entry in the MAG may comprise a list of IPv6 HNPs assigned to a MN's active interface and an associated flag. The flag may be set to the "H" value if the connected interface is the home interface or to the "S" value if the connected interface is not the home interface. If the MAG stores a BU list entry comprising HNPs associated with the "S" flag, the MAG may also store home interface HNPs and the corresponding "H" flag in another or the same BU list entry.

For example, if the MAG receives an "S" flag in the PBA message, the MAG may store the "S" flag and the associated HNPs in a BU list entry and may also store another set of HNPs and an associated "H" flag in a second BU list entry. Alternatively, the MAG may only receive a single set of HNPs associated with the home interface, which may or may not be associated with the "H" flag in the PBU message, and store the HNPs and the "H" flag in a corresponding BU list entry. The HNPs of the different interfaces may be associated with each other at the MAG, which may allow the MN to continue sending packets with source addresses selected based on the home interface HNPs that are associated with the "H" flag. Handling the PBA messages as such may also allow the MN to continue receiving packets on an active interface even after a flow binding on the home interface has expired. In this case, the LMA may continue to store the HNPs associated with the "H" flag and the home interface in a corresponding BCE.

Figure 2:
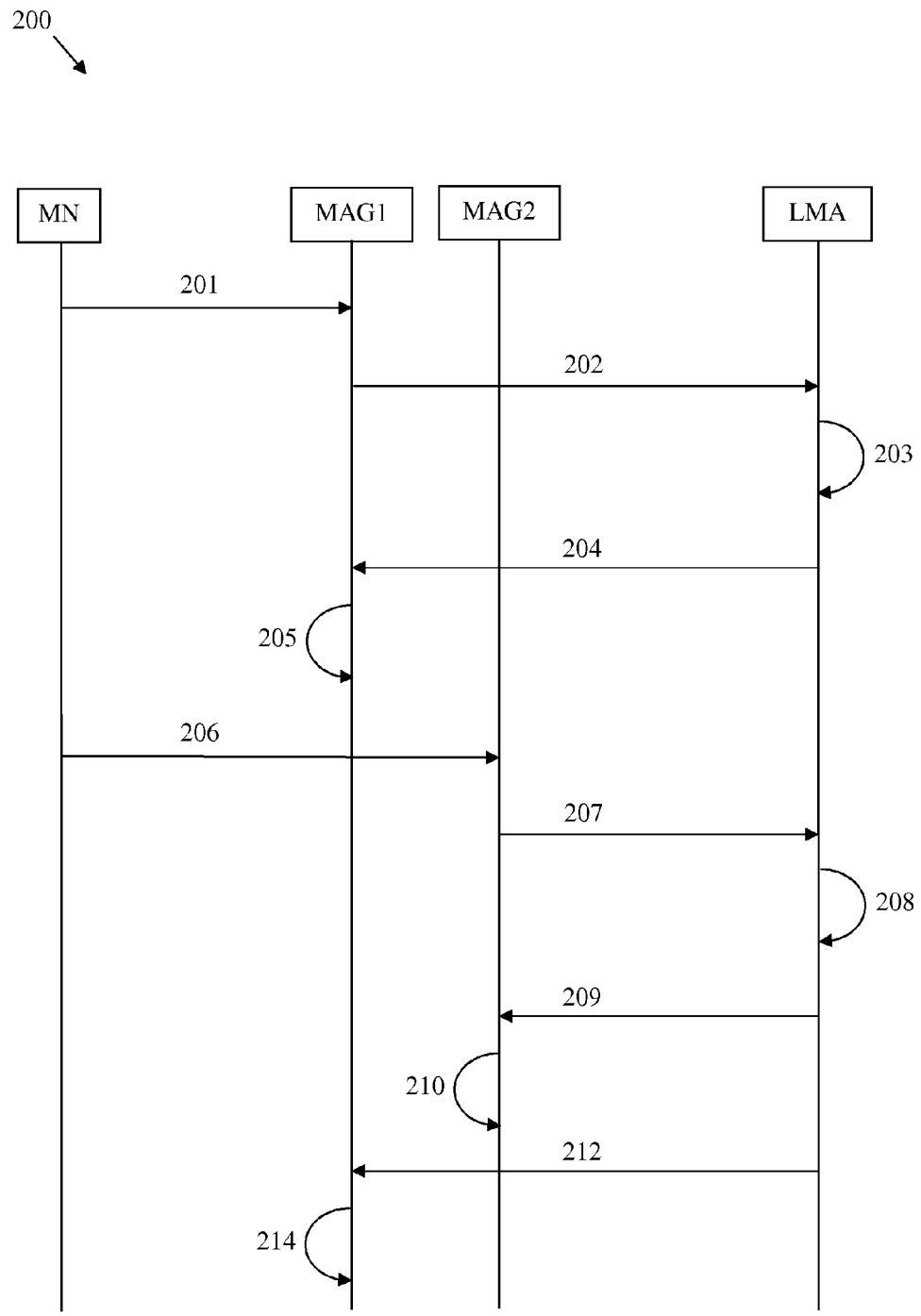
FIG. 2 is a protocol diagram of an embodiment of a method for supporting multi-homing and improving flow mobility in PMIPv6.

FIG. 2 illustrates an embodiment of a method 200 for supporting multi-homing and improving flow mobility in PMIPv6. The method 200 may comprise a plurality of sequences between a LMA, one or more MAGs, and a MN. For instance, the method 200 may be implemented to establish multiple active interfaces for the MN 102 with the first MAG 112 and/or the second MAG 122 and update the corresponding BCEs in the LMA and BU list entries in the MAG(s) accordingly. Thus, the LMA and the MAG(s) may use the BCEs and BU list entries, respectively, to efficiently direct incoming traffic to the MN and guarantee flow mobility using a HoA assigned to a home interface of the MN.

At step 201, the MN may connect to a first MAG to establish a first interface. For example, the MN 102 may connect to the first MAG 112 in the first wireless access network 110 to receive services from the service provider network 140 via the LMA 130. At step 202, the first MAG may send a PBU message to the LMA to inform the LMA of the active interface with the MN. For instance, the first MAG 112 may set the HI value in the PBU message to about one to indicate to the LMA an attachment over a new interface.

At step 203, the LMA may add a first BCE for the MN and may set the "H" flag value in the first BCE to register the first interface as the home interface for the MN. The first BCE may or may not comprise the flag value. The LMA may generate a first list of HNPs in the first BCE, which may be used to provide a HoA for the MN. Additionally, the LMA may add a first flow binding entry corresponding to the home interface in the flow state table. The first flow binding entry may indicate a Proxy CoA for the first MAG that is connected to the home interface.

At step 204, the LMA may send a PBA message to the first MAG that comprises the first list of HNPs for the home interface. The PBA message may or may not comprise the "H" flag. At step 205, the first MAG may add a new BU list entry for the home interface that comprises the first list of HNPs in the PBA message. The BU list entry may or may not comprise the "H" flag. The LMA and the MN may then establish a flow binding on the home interface to direct a flow from/to the MN on the home interface. The flow may be directed to the MN using a HoA that is assigned to the MN based on the HNPs.

At step 206, the MN may connect to a second MAG to establish a second interface. For example, the MN 102 may connect to the second MAG 122 in the second wireless access network 120, e.g. using a different wireless technology than the first wireless network 110, to receive services from the service provider network 140 via the LMA 130. At step 207, the second MAG may send a PBU message to the LMA to inform the LMA of the second active interface with the MN. The second MAG may set the HI value in the PBU message to about one to indicate to the LMA an attachment over a new interface.

At step 208, the LMA may add a second BCE for the MN and may set the "S" flag value in the second BCE to register the second interface as a secondary interface for the MN. The LMA may generate a second list of HNPs in the second BCE and link the second BCE of the secondary interface to the first BCE of the home interface. In another embodiment, the LMA may add the second list of HNPs and the "S" flag to the same BCE of the home interface. Additionally, the LMA may add a second flow binding entry corresponding to the secondary interface in the flow state table, which indicates a Proxy CoA for the second MAG that is connected to the secondary interface.

At step 209, the LMA may send a PBA message to the second MAG of the second interface that comprises the second list of HNPs and the "S" flag. The PBA message may also comprise the first list of HNPs and the associated "H" flag. At step 210, the second MAG may add a BU list entry for the secondary interface that comprises the second list of HNPs in the PBA message and the "S" flag and a second BU list entry for the home interface that comprises the first list of HNPs and the "H" flag. In another embodiment, the second MAG may add the second list of HNPs and the "S" flag to the same BU list entry of the home interface.

At step 212, the LMA may also send a PBA message to the first MAG of the home interface that comprises the second list of HNPs and the "S" flag. The PBA message may also comprise the first list of HNPs and the associated "H" flag. At step 214, the first MAG may add a BU list entry for the secondary interface that comprises the second list of HNPs in the PBA message and the "S" flag. The first MAG may also update the previously added BU list entry for the home interface that comprises the first list of HNPs and the "H" flag. In another embodiment, the second MAG may add the second list of HNPs and the "S" flag to the same BU list entry of the home interface. The LMA and the MN may then establish a flow binding on the secondary interface to direct a flow from/to the MN on the secondary interface. The flow binding may correspond to the same flow that was directed on the home interface and that is moved to the secondary interface without session interruption. The flow may be directed on the secondary interface to the MN using the same HoA that is assigned to the MN based on the first list of HNPs.

Figure 3:
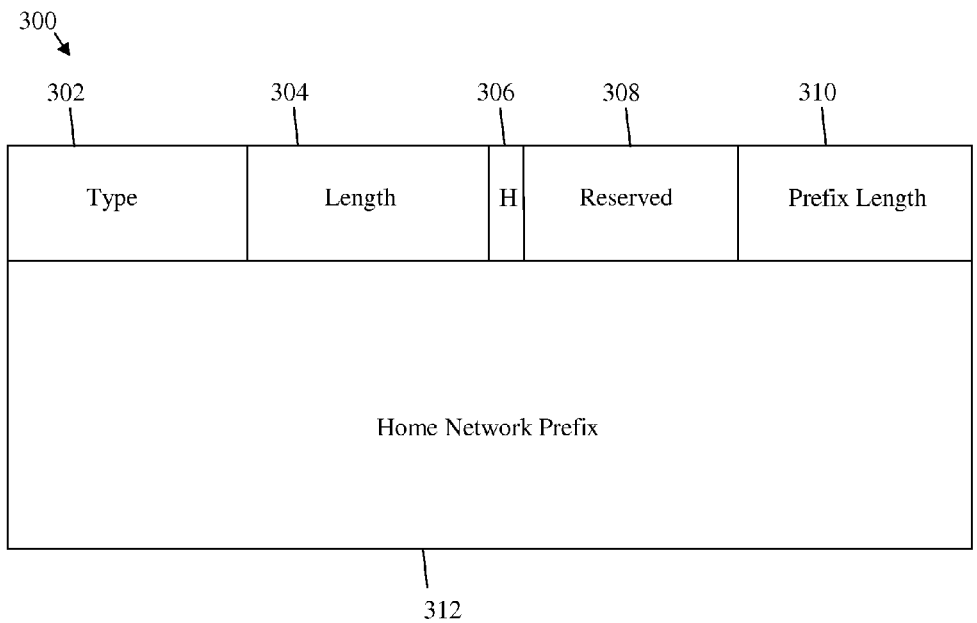
FIG. 3 is a schematic diagram of an embodiment of a home network prefix option.

FIG. 3 is an embodiment of a HNP option 300. The HNP option 300 may be configured to support multi-homing and improve flow mobility in PMIPv6. Specifically, the HNP option 300 may be configured to indicate the HNPs assigned to an active interface and whether the interface is a home interface or a secondary interface that may be linked to the home interface. For instance, the HNP option 300 may be sent in the PBA message from the LMA to the MAG when implementing the method 200. The HNP option 300 may comprise a Type field 302, a Length field 304, a Reserved field 308, a Prefix Length field 310, and a HNP field 312, which may be configured as described in RFC 5213. The Type field 302 may indicate a HNP option type, the Length field 304 may indicate the total length of the HNP option (e.g. in bytes or bits), and the Reserved field 308 may be reserved and may not be used. The Prefix Length field 310 may indicate the length of the HNP field 312 (e.g. in bytes or bits) and the HNP field 312 may comprise a list of HNPs assigned to an active interface. The HNP option 300 may also include an "H" Flag 306 that may be set to the "S" value if the active interface is a secondary interface or may not be set (e.g. set to the "H" value) if the active interface is a home interface. For instance, the "H" Flag 306 may be set to about zero for the home interface or to about one for the secondary interface.

Figure 4:
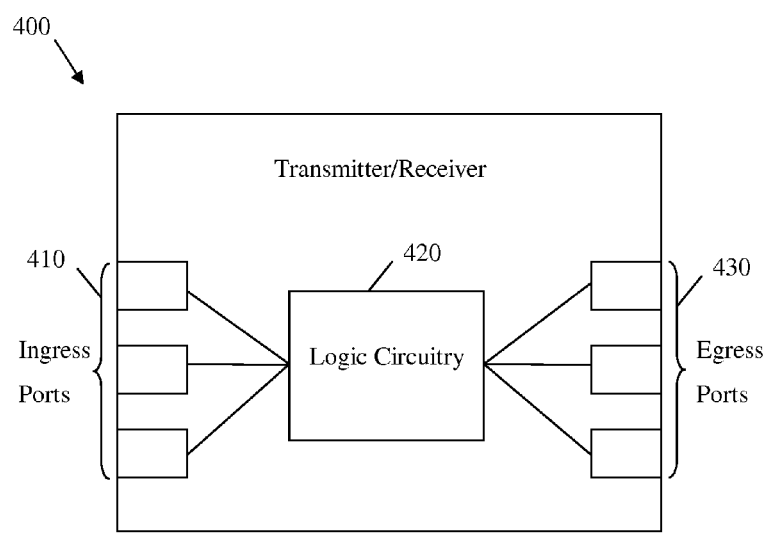
FIG. 4 is a schematic diagram of an embodiment of a transmitter/receiver unit.

FIG. 4 illustrates an embodiment of a transmitter/receiver unit 400, which may be any device that transports packets through a wireless access network system. For instance, the transmitter/receiver unit 400 may be coupled to or located at the LMA, the MAG(s), and/or the MN, e.g. in the wireless access network system 100. The transmitted/receiver unit 400 may comprise one or more ingress ports or units 410 for receiving packets, objects, or type-length-values (TLVs) from other network components, logic circuitry 420 to determine which network components to send the packets to, and one or more egress ports or units 430 for transmitting frames to the other network components.

Figure 5:
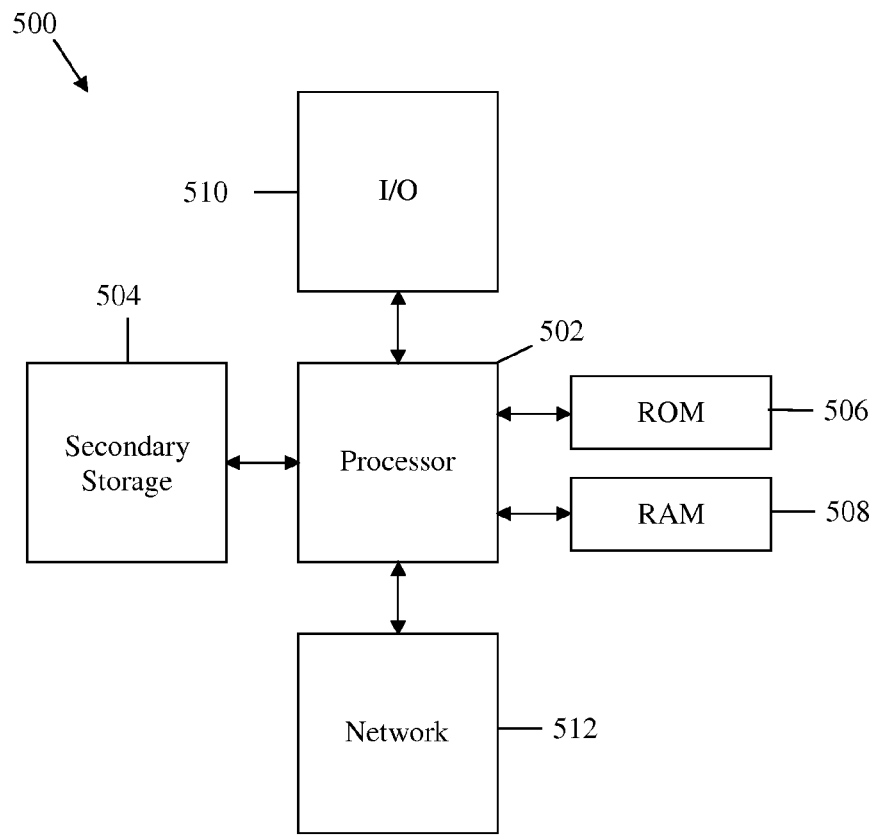
FIG. 5 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including second storage 504, read only memory (ROM) 506, random access memory (RAM) 508, input/output (I/O) devices 510, and network connectivity devices 512. The processor 502 may be implemented as one or more CPU chips, or may be part of one or more application specific integrated circuits (ASICs).

The second storage 504 is typically comprised of one or more disk drives or tape drives and is used for non-volatile storage of data and as an over-flow data storage device if RAM 508 is not large enough to hold all working data. Second storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of second storage 504. The RAM 508 is used to store volatile data and perhaps to store instructions. Access to both ROM 506 and RAM 508 is typically faster than to second storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:
1. An apparatus comprising:
a local mobility anchor (LMA) configured to:
maintain a plurality of binding cache entries (BCEs) for a plurality of active interfaces between a mobile node

(MN) and a plurality of mobile access gateways (MAGs) comprising a first MAG and a second MAG; and maintain a flow state table with a plurality of binding flow entries for the active interfaces between the MN and the MAGs to distinguish an interface with a flow to direct incoming traffic to the MAGs and MN accordingly, wherein the binding flow entries describe a condition of flows on the active interfaces and associate a flow with the MAG communicating with the MN and an interface corresponding to the flow, wherein the BCEs comprise a first BCE that corresponds to a home interface between the MN and the first MAG and that comprises a first list of home network prefixes (HNPs), wherein the BCEs further comprise a second BCE that is linked to the first BCE, that corresponds to a secondary interface between the MN and the second MAG, and that comprises a second list of HNPs, and wherein the first BCE and the second BCE are associated with a single mobility session.

2. The apparatus of claim 1, wherein the first BCE further comprises a home interface (H) flag, wherein the second BCE further comprises a secondary interface (S) flag, and wherein the LMA uses the H flag and the S flag to determine whether to assign the HNPs in the first BCE and the second BCE to the MN during a handover from the home interface to the secondary interface.

3. The apparatus of claim 2, wherein the MAGs comprise a plurality of binding update (BU) list entries for the corresponding active interfaces, wherein each one of the MAGs comprises a first BU list entry that corresponds to the home interface and comprises the list of HNPs associated with the H flag, and a second BU list entry that corresponds to a secondary interface connected to the MAG and comprises the S flag.

4. The apparatus of claim 1, wherein the active interfaces are associated with a home address (HoA) configured on a logical interface of the MN that is based on the HNPs in the first BCE.

5. An apparatus comprising:
a local mobility anchor (LMA) configured to:
maintain a plurality of binding cache entries (BCEs) for a plurality of active interfaces between a mobile node (MN) and a plurality of mobile access gateways (MAGs) comprising a first MAG and a second MAG; and maintain a flow state table with a plurality of binding flow entries for the active interfaces between the MN and the MAGs to distinguish an interface with a flow to direct incoming traffic to the MAGs and MN accordingly, wherein the binding flow entries describe a condition of flows on the active interfaces and associate a flow with the MAG communicating with the MN and an interface corresponding to the flow, wherein the BCEs comprise a first BCE that corresponds to a home interface between the MN and the first MAG and that comprises a first list of home network prefixes (HNPs), wherein the BCEs further comprise a second BCE that is linked to the first BCE, that corresponds to a secondary interface between the MN and the second MAG, and that comprises a second list of HNPs, and wherein the first list of HNPs is the same as the second list of HNPs.

6. The apparatus of claim 1, wherein the first list of HNPs is not the same as the second list of HNPs.

7. The apparatus of claim 1, wherein each of the binding flow entries in the flow state table indicates a care-of-address (CoA) of one of the MAGs that is connected to one of the interfaces indicated by one of the BCEs.

8. The apparatus of claim 1, wherein the binding flow entries are associated with the secondary interface, but not the home interface, after a handover.

9. A network component comprising:
a receiver unit configured to:
receive a first proxy binding update (PBU) message for a home interface between a mobile node (MN) and a first mobile access gateway (MAG); and
receive a second PBU message for a second interface between the MN and a second MAG;
a processor configured to:
process the first PBU message to create a first binding cache entry (BCE) for the home interface that comprises a first list of home network prefixes (HNPs); and
process the second PBU message to create a second BCE for the second interface that comprises a second list of HNPs associated with a second interface (S) flag and the first BCE, wherein the S flag indicates the second interface is not the home interface;
maintain a flow state table with a plurality of binding flow entries for the active interfaces between the MN and the MAGs to distinguish an interface with a flow to direct incoming traffic to the MAGs and MN accordingly, wherein the binding flow entries describe a condition of flows on the active interfaces and associate a flow with the MAG communicating with the MN and an interface corresponding to the flow, and
a transmitter unit coupled to the processor and configured to:
send a first proxy binding acknowledgement (PBA) message to the first MAG; and
send a second PBA message to the second MAG,
wherein the first PBA message and the second PBA message each comprise the first list of HNPs, the second list of HNPs, and the S flag associated with the second list of HNPs.

10. The network component of claim 9, wherein the first list of HNPs is associated with a home interface (H) flag in the first BCE and in the PBA message.

11. The network component of claim 9, wherein a home address (HoA) for the MN is generated based on the first list of HNPs in the first BCE for the home interface, and wherein the HoA is used as a destination address in a plurality of packets that are forwarded on the home interface and the second interface to the MN.

12. The network component of claim 11, wherein the packets are directed based on a flow state table that comprises a first flow binding entry for the home interface and a second flow binding entry for the second interface, and wherein the first flow binding entry indicates a first proxy care-of-address (CoA) for the first MAG and the second flow binding entry indicates a second proxy CoA for the second MAG.

13. The network component of claim 12, wherein the packets are matched against the first flow binding entry and the second flow binding entry to retrieve a proxy CoA for a MAG that matches the packets flow.

14. The network component of claim 13, wherein packets are directed on an interface indicated by the first BCE or the second BCE that matches the packets flow and corresponds to the MAG.

15. A method comprising:
   detecting a connection with a mobile node (MN) on a new interface;
   sending a proxy binding update (PBU) message to a local mobility anchor (LMA), wherein the PBU message indicates the new interface and is transmitted for storage in a flow state table at the LMA that maintains a plurality of binding flow entries for interfaces between the MN and a mobile access gateway (MAG) for distinguishing interfaces associated with a flow for directing incoming traffic to the MAG and MN accordingly, wherein the PBU message is transmitted to support storage of the binding flow entries in order to describe a condition of flows on the interfaces and associate a flow with the MAG and an interface corresponding to the flow; and
   receiving, by a mobile access gateway (MAG), a proxy binding acknowledgement (PBA) message from the LMA that comprises:
      a home interface (H) flag indicating a first plurality of home network prefixes (HNPs) are associated with a MN home interface;
      the first plurality of HNPs associated with the home interface;
      a secondary interface (S) flag indicating a second plurality of HNPs are associated with a MN secondary interface; and
      the second plurality of HNPs associated with the secondary interface.

16. The method of claim 15 further comprising:
   updating a BU list entry for the home interface by the HNPs associated with the H flag; and
   generating a second BU list entry for the MN comprising the HNPs associated with the secondary interface and the associated S flag if the new interface is not the home interface of the MN.

17. The method of claim 15 further comprising generating a BU list entry for the MN comprising the HNPs associated with the home interface and the associated H flag if the new interface is the home interface of the MN.

18. The method of claim 15 further comprising sending a second PBU message to the LMA to update a binding cache entry (BCE) for the secondary interface, wherein the first PBU or the second PBU message comprises a handover indicator (HI) that is set to about one to indicate to the LMA an attachment over a new interface to initiate a flow binding over the new interface.

19. The method of claim 15, wherein the PBA message comprises a HNP option that comprises a Type field, a Length field, a Flag, a Prefix Length field, and a HNP field, wherein the Flag is set to the S flag value if the new interface is not the home interface or is not set if the new interface is the home interface, and wherein the HNP field comprises the corresponding HNPs.

* * * * *